Feb. 14, 1933. H. K. FAIRALL ET AL 1,897,369
METHOD OF PRODUCING A COLOR POSITIVE FOR USE IN A COLORED MOTION PICTURE
Filed Aug. 17, 1927
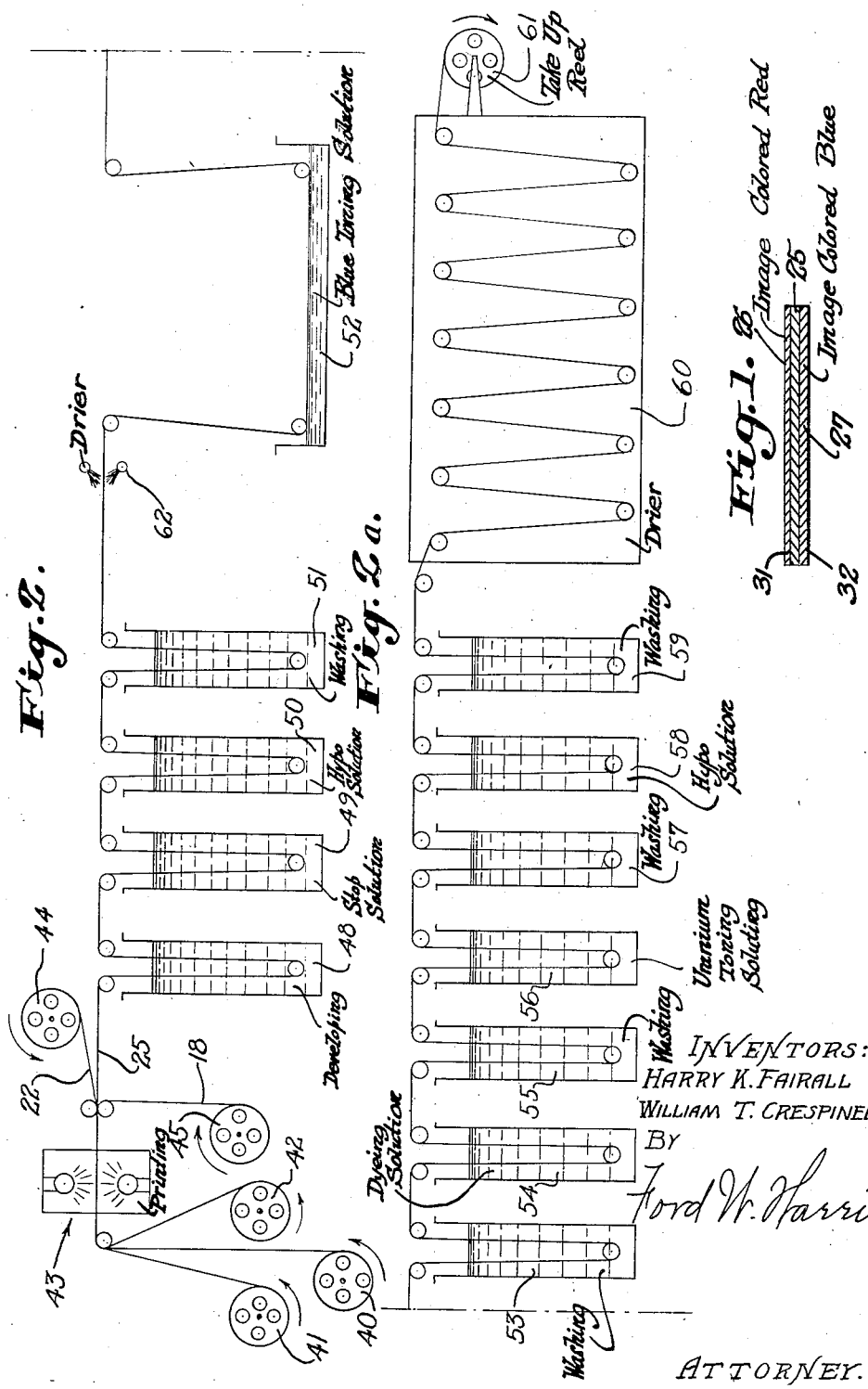

Patented Feb. 14, 1933

1,897,369

UNITED STATES PATENT OFFICE

HARRY K. FAIRALL AND WILLIAM T. CRESPINEL, OF LOS ANGELES, CALIFORNIA, ASSIGNORS, BY MESNE ASSIGNMENTS, TO MULTICOLOR LTD., OF LOS ANGELES, CALIFORNIA, A CORPORATION OF CALIFORNIA

METHOD OF PRODUCING A COLOR POSITIVE FOR USE IN A COLORED MOTION PICTURE

Application filed August 17, 1927. Serial No. 213,468.

Our invention relates to color photography and more particularly to the art of producing color motion picture films.

Colored motion pictures are produced in several different ways and we shall therefore confine our attention to the method, in the production of film for which our invention is particularly applicable. In this method an object having several colors is photographed from the same viewpoint upon two negative films. Interposed between the object and one of these negative films is a transparent green-blue filter and between the object and the other negative film a transparent orange-red filter. The negative films are then removed from the camera and developed. An unexposed positive film is then provided, having an emulsion applied to each of the opposite faces thereof. This emulsion is impregnated with a dye to render the film opaque and this permits corresponding portions of the two developed negative films to be printed simultaneously upon opposite sides of the positive film.

When the positive film has been thus exposed, it is developed and has the opaque dye washed out and is then ready for having the opposite faces thereof colored orange-red and blue respectively. The image of the positive film printed from the negative which was exposed through an orange-red filter is dyed or treated chemically to give it a blue color. The image on the opposite side of the positive is in a similar manner dyed or treated chemically to give it an orange-red color. This positive film is now ready for use in a projecting machine. The projecting beam of light in passing through the positive film is colored blue or orange-red in those portions thereof which correspond respectively to the blue or orange-red values of the object originally photographed.

Our process relates to the production of a colored motion picture film by means of a "subtractive" process as distinguished from an "additive" process.

The subtractive primary colors are red, yellow, and blue, or perhaps more correctly, magenta, yellow, and blue-green. Any two-color process will necessarily give but an approximation of perfect color reproduction.

In our process as ordinarily practiced, the images are not colored orange-red and green-blue, respectively, but orange-red and blue. Strictly speaking, these colors are not complementary, but the orange-red dye-toning and blue toning solutions used give substantially complementary color values. By the term "complementary color values" we do not mean complementary colors in the sense that a physicist would use the terms, but do mean that the colors are such that when said complementary color value images are projected on a screen, substantial color reproduction will be produced. It is true that in our process as usually practiced, the greens, blue-greens and green-blues are colored blue, but these hues may be obtained by a modification of our process which will be described in detail hereinafter. A color complementary to that rendered by our orange-red dye-toning process may also be produced by the modification referred to.

Several processes are at present used for giving color to the silver images on the positive film. None of the coloring processes in use at present permit the dense masses only of each positive image to be colored so that the clear spaces on each remain clear without a long washing step in the process, which step is exceedingly detrimental due to the tendency of alkali in the water to attack and damage the colored image.

It is an object of our invention to provide a process of coloring a motion picture film whereby satisfactory colors may be given to respective images and whereby the clear spaces of said images remain substantially uncolored.

It is another object to provide such a process which operates without damage to the film.

Further objects and advantages will be made apparent in the following description and in the accompanying drawing in which an apparatus for carrying out our invention is diagrammatically illustrated. In the drawing:

Fig. 1 shows a double coated positive film having images on opposite sides thereof colored orange-red and blue respectively.

Figs. 2 and 2a are diagrammatic views illustrating an apparatus for carrying out the process of our invention in the production of a colored positive motion picture film.

In our method an object having several colors is photographed from the same viewpoint upon two negative films producing substantially complementary color value images, such as orange-red and green-blue. These may be produced by any of the well known methods, such as by means of a light splitting camera provided with suitable color filters interposed between the object and the negatives.

The numeral 18 designates a negative film in which an orange-red filter was interposed between the object and said negative film, and 22 designates a negative film in which a green-blue filter was interposed between the object and said negative film. The negative films 18 and 22 are then removed from the camera and developed.

In order to provide a single, bi-colored film for use in the standard projection machines, a positive film 25 is provided, having emulsions 26 and 27 provided upon opposite faces thereof. Emulsions 26 and 27 are impregnated with a light retardent dye which permits the simultaneous printing of negatives 18 and 22 on opposite sides of the film 25 on the emulsion coatings 26 and 27 respectively. Means are provided to secure exact superimposed registry of the respective images with each other.

The positive images 31 and 32 printed upon the layers of emulsion 26 and 27 by the blue negative and orange-red negative respectively are complementary to said negatives. The image on the positive 31 is now treated so that it will be colored orange-red, and the image on the positive 32 is treated so it will be colored blue. As the purpose of the positive film 25 is to project an image of the object photographed in its true colors, this will be substantially accomplished by the passing of a projecting beam of light through the corresponding positives 31 and 32, with these disposed in the accurately superimposed relation in which they are printed on opposite sides of the positive film 25.

The processes at present used for the treating of the positive 25 for coloring the images 31 and 32 have certain defects which are overcome by the process of our invention which may be carried on by the apparatus diagrammatically shown in Figs. 2 and 2a.

This apparatus includes a fresh positive feed reel 40, a blue negative feed reel 41, an orange-red negative feed reel 42, a printing device 43, blue and orange-red winding reels 44 and 45, a series of tanks 48, 49, 50, and 51, a blue toning tank 52, a series of treating tanks 53, 54, 55, 56, 57, 58, and 59, a drier 60, and a positive film winding reel 61. Air jet pipes 62 are mounted adjacent to the film as it passes between the tank 51 and the blue toning tank 52. This apparatus is operated in the following manner to carry out our method of producing a double-coated positive color film:

A supply of fresh double-coated film is provided upon the reel 40 and as the film is advanced through the apparatus, this fresh film is drawn from the reel 40 and passed through the printing device 43 between the blue and orange-red negatives which are unwound from the reels 41 and 42 respectively. After the positive 25 has been printed, the negatives 18 and 22 are wound upon the reels 45 and 44 respectively. The printed positive film then passes through a bath of soft developer in the tank 48 and after that, through a stop bath formed by a weak solution of acetic acid which is placed in the tank 49. The printing and developing of the positive 25 are carried on in a dark room but the remainder of the process may be conducted in the light.

Leaving the tank 49, the film 25 passes through a fixing solution in tank 50 after which the film passes through a water wash in the tank 51. Leaving the tank 51, the film 25 is practically dried by jets of air blowing at high velocity from the pipe 62 disposed close to the film. The film then passes through a blue toning tank 52 which completely converts the positive silver image 32, which was printed from the orange-red negative 18, into a blue image. One formula for the acid iron-tone solution or acid ferric-tone solution placed in the tank 52 is as follows:

| | | |
|---|---|---|
| Ferric ammonium oxalate | 4.5 | grams |
| Potassium ferricyanide | 2 | grams |
| Ammonium chloride | 4 | grams |
| Hydrochloric acid | 2 | cc. |
| Water | 500 | cc. |

The tank 52 may be of any suitable construction which restricts the application of the treating liquid to only one side of the positive film, but this tank is preferably of the form shown in the application of Robert F. Elder, Serial No. 96,656, filed March 22, 1926, method of producing colored film, which has since matured into Patent No. 1,734,476, dated Nov. 5, 1929, and is therefore only diagrammatically illustrated in Fig. 2.

After leaving the tank 52, the positive film 25 is given a complete water wash in the tank 53, from which tank the film passes into the tank 54 which contains a solution of orange-red dye in which the entire film is bathed for approximately one minute. The preferred formula for this dye is as follows:

*Stock solution A*

| | | |
|---|---:|---|
| Basic magenta | 1 | gram |
| Distilled water | 250 | cc. |
| Glacial acetic acid | 5 | cc. |

*Stock solution B*

| | | |
|---|---:|---|
| Auramine | 1 | gram |
| Distilled water | 250 | cc. |
| Acetic acid | 5 | cc. |

For use we take 50 cc. of stock solution A and 25 cc. of stock solution B and 200 cc. of distilled water.

The film is now run through a brief water wash in the tank 55, and then into the tank 56, where it is immersed in an acid uranium-tone solution. The formula for the acid uranium-tone solution is as follows:

| | | |
|---|---:|---|
| Potassium oxalate | 12 | grams |
| Uranium nitrate | 32 | grams |
| Hydrochloric acid | 32 | cc. |
| Potassium ferricyanide | 9 | grams |
| Water | 4000 | cc. |

The surplus of the orange-red dye of the formulæ given is rinsed from the film prior to going into the uranium solution; furthermore, the dye is removed from the clear portions of the film by some chemical action in the uranium solution and does not need additional washing.

The orange-red dye in the image 31 is mordanted by the uranium solution so as to convert the silver image 31 into an orange-red image. The image 31 is therefore not only a dyed image but also a uranium toned image.

The length of time required to complete the orange-red dye-toning in the uranium solution is approximately five to seven minutes. The quantity of dye which mordants onto the image increases with time, so that short immersion will give a slightly colored image, and prolonged immersion will give a strongly colored image. After leaving the uranium solution, the film 25 passes through a water wash in the tank 57, a hypo solution in the tank 58, another water wash in the tank 59, and then passes through the drier 60 and is wound up on the winding reel 61.

Before entering the hypo solution, the images are usually opaque, due to the presence of silver ferrocyanide. The hypo dissolves this silver ferrocyanide, thereby removing all traces of opaqueness from the images.

Owing to the complete transformation of the positive silver image 32 to a blue image in the tank 52, this side of the film is entirely unaffected by the orange-red dye and uranium solutions so that the film 25 when wound upon the reel 61 has the opposite images thereof perfectly colored to produce a projected image of the original in its natural colors.

The image 31 is chemically converted from a silver image to a blue colored inorganic substance and is not affected by the subsequent color treatment of the film. The free spaces of the film are remarkably clear when the film comes out of the tank 59.

Where a blue-green or green color is desired for some particular effect, said color may be obtained by a modification of our process. The blue toning treatment is not carried to completion in toning tank 52, so that the silver image is only partially converted, leaving some unaltered silver grains. This may be accomplished in several ways, such as by using dilute solutions, or by shortening the time of treatment. The subsequent uranium solution acts upon the unconverted silver grains of the blue image to turn the said unconverted silver grains to a yellowish color, which modifies the blue color of the rest of the blue image to give said image a green-blue, blue-green, or greenish hue. The resultant color depends upon (1) the amount of silver grains left unaltered after the blue-toning treatment, and (2) the amount of time that the said image is treated in the uranium and dyeing solutions. Obviously, the larger the amount of silver grains left unaltered after the blue-toning treatment, and the longer the time of treatment in the uranium and dyeing solutions, the more the color of the "blue" image will be modified.

In the claims we have used "chemically toning" to mean the conversion of the silver image into a colored inorganic substance, and have used "dye-toning" to mean the conversion of the silver image into an inorganic substance and the attachment of a dye to said inorganic substance. The terms "red" and "blue" are used in a broad sense, i. e., to designate color values of their respective portions of the spectrum rather than single color values. By "color treatment" we mean dyeing, chemically toning, dye-toning, imparting or restoring color, and specifically exclude "removing the opaqueness from an image". By "partially converting", or "partially chemically toning", we mean that the process of conversion or chemically toning is not carried to completion, in that some of the silver grains of the image are left unaltered.

Although we have outlined the use of but one pair of substantially complementary colors, the features of our invention may be utilized in the production of any complementary color values. This may be accomplished by varying the time of the several treatments, by varying the strength of the solutions, or by using other dyeing and toning solutions.

Thus, red and green images may be produced by substituting a "red" dye for the orange-red dyes, and by using the modification of our blue toning treatment as outlined.

We claim as our invention:

1. In the art of producing a colored motion picture film, the process which consists in producing images upon said film, treating certain of said images with a solution including substantially:

| | |
|---|---|
| Ferric ammonium oxalate | 4.5 grams |
| Potassium ferricyanide | 2 grams |
| Ammonium chloride | 4 grams |
| Hydrochloric acid | 2 cc. |
| Water | 500 cc. | washing the excess of said solution from the images treated, treating said film with a solution of red dye, washing the excess red dye from said film, bathing said film in a solution including substantially:

| | |
|---|---|
| Potassium oxalate | 12 grams |
| Uranium nitrate | 32 grams |
| Hydrochloric acid | 32 cc. |
| Potassium ferricyanide | 9 grams |
| Water | 4000 cc. | and washing the excess of said last mentioned solution from said film.

2. A process as outlined in claim 1 in which the red dye comprises a mixture of solutions of basic magenta and auramine.

3. In the art of producing a colored motion picture film, the process which consists in producing images upon said film, treating certain of said images with a solution including substantially:

| | |
|---|---|
| Ferric ammonium oxalate | 4.5 grams |
| Potassium ferricyanide | 2 grams |
| Ammonium chloride | 4 grams |
| Hydrochloric acid | 2 cc. |
| Water | 500 cc. | washing the excess of said solution from the images treated, treating said film with a solution of dye having red color characteristics, washing the excess dye having red color characteristics from said film, bathing said film in a solution including substantially:

| | |
|---|---|
| Potassium oxalate | 12 grams |
| Uranium nitrate | 32 grams |
| Hydrochloric acid | 32 cc. |
| Potassium ferricyanide | 9 grams |
| Water | 4000 cc. | and washing the excess of said last mentioned solution from said film.

4. A method of producing double coated color film, including the steps of: producing images on opposite sides of said film; treating the images on one side of said film with an acid iron-tone solution to color said images blue and to simultaneously render said images impervious to red color treatments; and treating the images on the other side of said film with an acid uranium-tone solution to color same red.

5. A method of producing double coated color film, including the steps of: producing images on opposite sides of said film; treating the images on one side of said film with a chemical toning solution to chemically convert same in a manner to color said images blue and to simultaneously render said images impervious to red color treatments; and treating the images on the other side of said film with an acid uranium-tone solution to color same red.

6. A method of producing a double coated color film, including the steps of: producing images on opposite sides of said film; chemically converting the images on one side of said film to give same a bluish color, and to simultaneously render same impervious to treatment by a color-producing agent of a reddish color; and treating said images on the opposite side of said film to give same a reddish color, using a color-producing agent which comprises an acid uranium-tone solution and which will not treat the already-treated images.

7. A method of producing a double coated color film, including the steps of: producing images on opposite sides of said film; treating the images on one side of said film to give same a color of one color family, and to simultaneously render same impervious to treatment by a color-producing agent of a complementary color family; and treating said images on the opposite side of said film to give same a color of a complementary color family, using a uranium bath which will not treat the already-treated images.

8. A method of producing a double coated color film, including the steps of: producing images on opposite sides of said film; chemically converting the images on one side of said film to give same a bluish color, and to simultaneously render same impervious to treatment by a color-producing agent of a complementary color family; and treating said images on the opposite side of said film to give same a reddish color, using a color-producing agent which will not treat the already-treated images, said color producing agent consisting of an acid uranium-tone solution which includes:

| | |
|---|---|
| Potassium oxalate | 12 grams |
| Uranium nitrate | 32 grams |
| Hydrochloric acid | 32 cc. |
| Potassium ferricyanide | 9 grams |
| Water | 4000 cc. |

9. A method of producing double coated color film, including the steps of: producing images on opposite sides of said film; treating the images on one side of said film which in a single step colors these images a bluish color and renders them impervious to a complementary color treatment; and treating the images on the opposite side of said film to give same a reddish color, using a color-producing agent in the form of an acid uranium-tone solution which will not affect the already-treated images.

10. A method of producing double coated color film, including the steps of: producing images on opposite sides of said film; treating the images on one side of said film which in a single step colors these images a bluish color and renders them impervious to a complementary color treatment; and immersing the film in a liquid color-producing agent which will not affect the already-treated images, to color the images on the opposite side of said film a reddish color.

11. A method of producing a double coated color film, including the steps of: producing in registry on opposite sides of said film, images of different color values; chemically treating the images on one side of said film to convert same to a bluish color and at the same time render these images non-receptive to a reddish color treatment; and treating the images on the opposite side of said film with a color-producing agent which will give these last-mentioned images a reddish color, but which will not color the already-treated images.

In testimony whereof, we have hereunto set our hands at Los Angeles, California, this 12th day of August, 1927.

HARRY K. FAIRALL.
WILLIAM T. CRESPINEL.